INVENTORS
BASIL H. MINNICH
EARL L. ALEXANDER
BY
*Stuart W. Wohlgemuth*
AGENT

United States Patent Office 3,518,916
Patented July 7, 1970

3,518,916
METHOD FOR PRODUCING REINFORCED SOLID PROPELLANT GRAINS
Basil H. Minnich, Simi, and Earl L. Alexander, Chatsworth, Calif., assignors to North American Rockwell Corporation, a corporation of Delaware
Filed Mar. 19, 1962, Ser. No. 179,466
Int. Cl. C06b 21/02
U.S. Cl. 86—1    2 Claims

ABSTRACT OF THE DISCLOSURE

A solid propellant grain manufacturing process, including placing a propellant matrix and reinforcing wire on a rotatable support to build up the propellant grain, wherein the wire is moved traversely to the rotatable support and a constant pressure is maintained on the grain outer surface as the grain is being formed.

---

This invention relates to a device for reinforcing solid propellant rocket grains. More particularly, the invention concerns a device and method for reinforcing solid propellant grains with a plurality of fine metallic filaments.

Solid rocket motors ordinarily are constructed with a heavy metal outer body, in which the solid propellant grain is encased. The outer shell must be strong enough to withstand the high pressure generated during firing of the grain since the grain itself has relatively low hoop and tensile strength. Since the solid grain is ordinarily composed of an organic polymeric binder, a particulate fuel and an oxidizer, it is incapable of withstanding the pressures generated during firing. Thus, the rocket motor contains a relatively high percentage of inerts which function only as structural elements and detract from the total ballistic performance of the rocket.

It has been proposed in co-pending application Ser. No. 114,265, filed Oct. 10, 1961, to provide a solid rocket motor in which the solid propellant grain has improved structural characteristics and a minimum of inert weight by means of a matrix including an organic polymeric binder which also serves as a fuel and an oxidizer having embedded therein a lattice of at least one substantially continuous metal reinforcing filament element functioning as a fuel component of the propellant grain. Additionally, various means have been proposed for producing a solid propellant grain having a metal reinforcing element therein. These previously proposed means for producing the reinforced grain have several disadvantages including a relatively high percentage of voids in the grain which serve to render irratic the combustion characteristics thereof. Additional disadvantages include a lack of close control over the percentage of reinforcing filaments used in the grain and a lack of close control over the relative percentages of the matrix, the combustible reinforcing material and binder material. Still another disadvantage of the previous methods proposed was that they were unable to produce a propellant grain having no excess of binder material therein. Additionally, the proposed means did not provide a degree of automaticity necessary for production of propellant grains and were mostly manual operations.

It is therefore an object of this invention to provide a means for producing a solid propellant grain having improved structural characteristics enabling construction of a rocket motor with a minimum of inert weight. Another object of this invention is to provide a device for producing a solid propellant grain having virtually no void spaces therein. A further object of this invention is a device for producing a reinforced solid propellant grain wherein there is close control over the percentages of a binder, oxidizer and reinforcing filaments. One other object of this invention is to provide a device for producing a reinforced propellant grain which has an unexpected high specific impulse. Still another object of the invention is to provide a reinforced grain wherein there is a minimum amount of binder material. A still further object of the invention is to provide a method for obtaining a reinforced propellant grain.

The above and other objects of this invention are provided by a device wherein a propellant matrix is combined with a metal wire in a winding operation. Such a device comprises means for rotating a propellant grain about its longitudinal axis while a warp of metallic wires is directed upon the turning grain through a guide means as the warp is caused to move longitudinally in relation to the grain while such grain is turning. Alternatively, the grain may be stationary with the warp of wires moving circumferentially about the grain. A means is provided for feeding the matrix to the surface of the grain while it is rotating. Additionally, a pressure means is maintained in contact with the outer surface of the rotating grain and serves, for example, to compact and to compress the matrix. The pressure means is of particular note and may be in the form of a pressure roll which, upon maintaining the pressure on the grain, enables the production of a propellant having an unexpectedly low percentage of binder and a very high specific impulse. This pressure roll lends particular novelty to the invention. The method of winding a reinforcing filament into a propellant grain as described may also be accomplished by a polar winding machine, in which case the grain revolves about the longitudinal axis and about a second axis through the center of the gravity. This second axis may form an angle which is approximately 80° with the longitudinal axis. In such a polar winding machine the wire warp which directs the wire upon the surface may be fed from a fixed point and does not have to traverse the longitudinal length of the grain as in the case of the previously described single axis machine. In the polar winding apparatus, a single wire may be used for reinforcing.

In the drawings accompanying this invention, FIG. 1 is a pictorial front view of a single axis winding machine of this invention.

Figure 1:
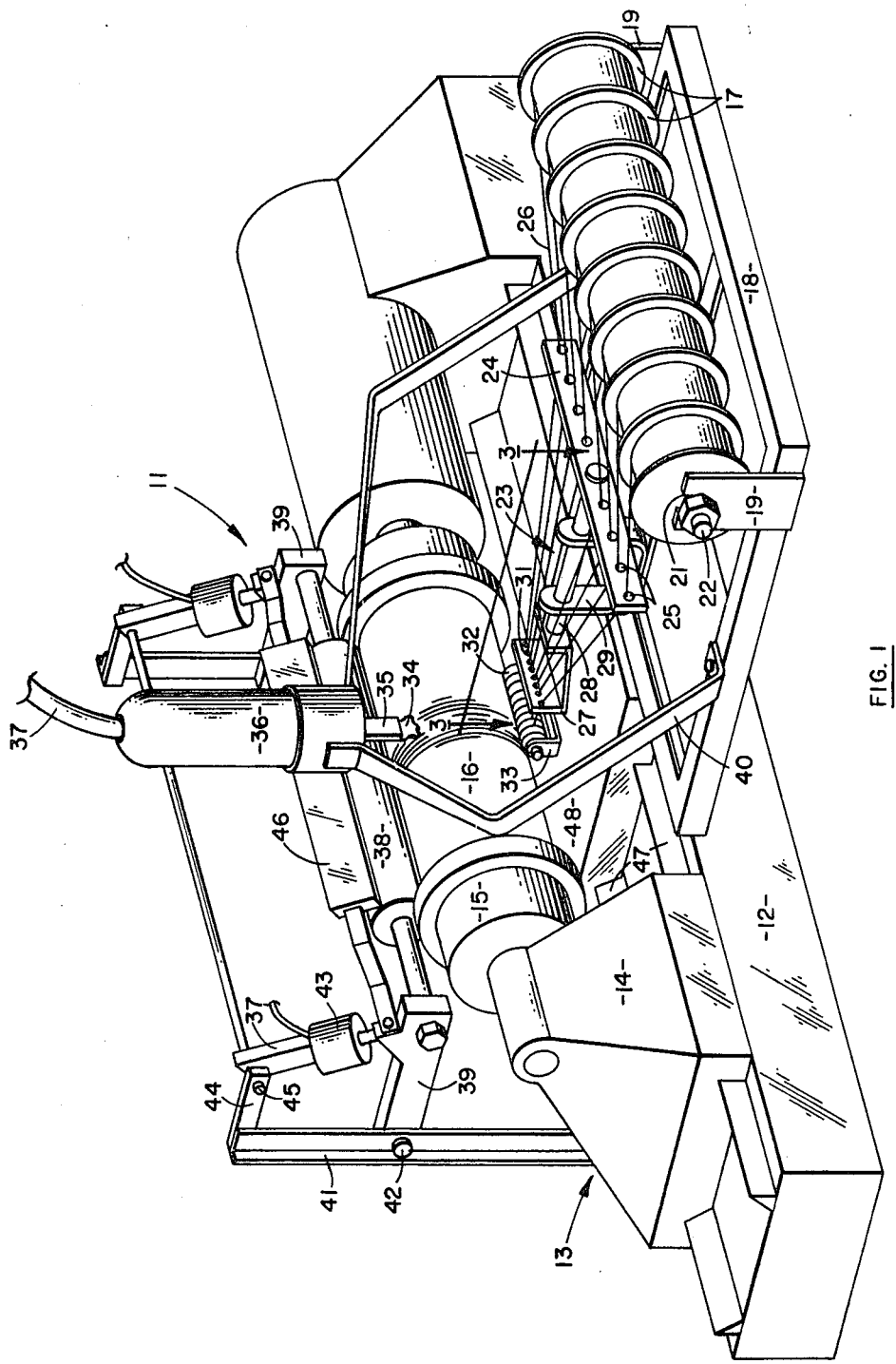
Figure 2:
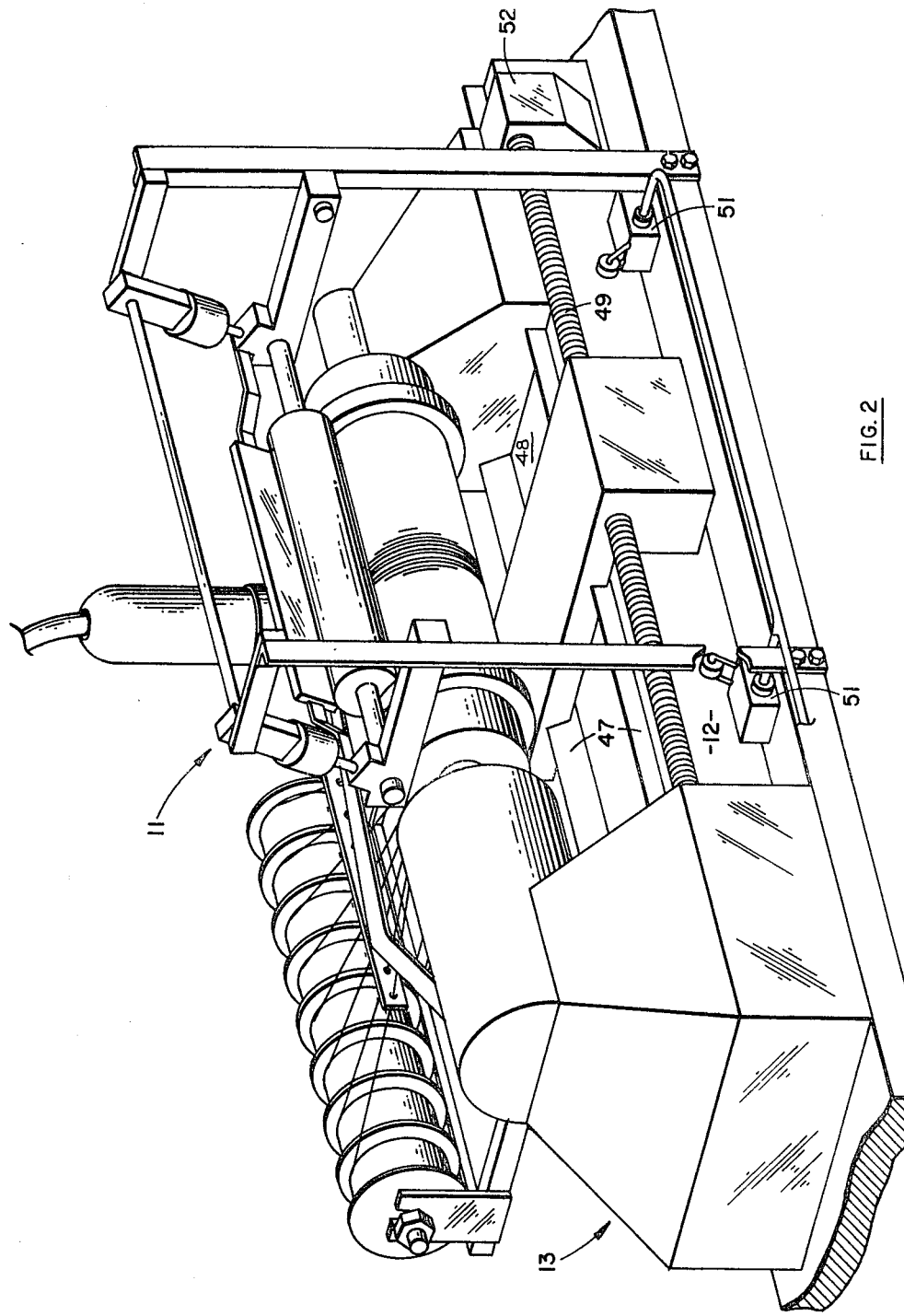
FIG. 2 is a rear pictorial view of the single axis winding machine device shown in FIG. 1.
Figure 3:
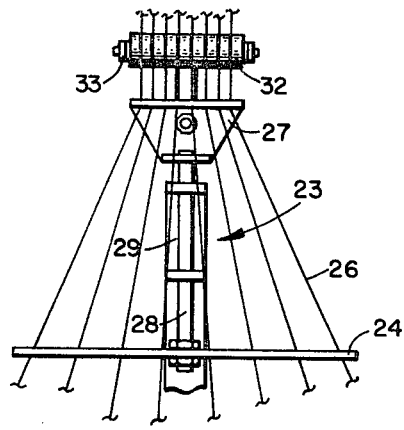
FIG. 3 is a top view of the wire guide means shown in FIG. 1.

Referring now to FIG. 1, there is shown a winding device 11 comprising a base 12 which supports a device similar to a conventional lathe 13 which comprises a housing 14 enclosing a drive means such as a conventional motor for rotating a mandrel 15 which supports the propellant grain 16. A plurality of spools 17 of the wire, which may be aluminum used to reinforce the propellant grain are supported on a support frame or carriage device 18 having two brackets 19 extending therefrom. The brackets 19 are attached at one end thereof to the support frame 18 and have a depression 21 at the opposite end to support an axle or rod member 22 which extends through the center of the spool of wire whereby the spools are free to rotate about the rod. A wire guide 23 is comprised of a first plate 24 having a plurality of apertures 25 therein which serve to direct the warp of wires onto the grain, the number of apertures being equivalent to the number of spools of wires being used in a given application. The first plate 24 is situated adjacent to the spools 17 of wire and serves to direct the wires into the same plane as established by the apertures 25. Additionally, this first plate 24 serves to constrict the distances between the individual wires as compared to the distances of the wires leaving the spool 17. From the first plate 24, the wires 26 are directed to a second plate 27 which second plate is maintained in juxtaposition to the first plate 24 by means of a rod 28 rigidly attached thereto which rod in turn is supported by a U-shaped member 29 which is fastened to the support member 18. The second plate 27 is provided with a plurality of aperture 31 equivalent in number to the strands of wire 26 which apertures serves to guide the wires to the rotating propellant grain. The apertures 31 are more closely spaced with relation to one another than the apertures 25 in the first plate 24. The apertures 31 serve to additionally equidistantly space the adjacent wires to each other. From the apertures 31 the wires 26 pass between a plurality of roillers 32 situated adjacent the rotating grain 16. The rollers are supported on a rod extending through their center which rod is attached to a U-shaped bracket 33 that is in turn rigidly fastened to the second plate 27. At this point particular reference is made to FIG. 3 wherein the rollers 32 with the wires 26 passing therebetween is better illustrated. The rollers 32 may be moved outwardly or away manually or by any mechanical means not shown from the grain 16 as the grain builds up in diameter so that the rollers can be maintained in a fairly constant relation to the outer diameter of the grain 16. This particular feature is not necessary for small diameter grains and the rollers can be permanently affixed in a position so that the grain may build up to its final diameter without necessitating a movement of the rollers away from the surface thereof. In the production of grains having rounded ends, it would be necessary for the rollers 32 to move inwardly during the winding of such end. Though a warp of eight wires is shown in FIGS. 1 and 2, the number of warp wires may be increased considerably to a point where several hundred wires may be use on a large production apparatus as disclosed. In some application, less than eight wire may be desirable.

Referring still to FIG. 1, the matrix 34 may be ejected under pressures from a nozzle 35 of a container 36 provided for containing the matrix. The container 36 is maintained under pressure by means of gaseous nitrogen, for example, directed thereto through a line 37 connected to a source not shown. By regulating the pressure to the container 36, the propellant may be forced onto the surface of the grain 16. Since the matrix is very viscous, it will not ordinarily flow through the nozzle 35 without application of pressure. Two support arms 40 attached at one end to the support frame 18 and at their opposite end to the container 36 serve to support the container in a position relative to the spinning grain 16 so that the matrix may be ejected onto the surface of the grain. Though the container 36 is shown as rigidly spatially displaced from the grain. it should be understood that for the production of larger diameter rocket motor grains, a means could be provided to move the container 36 proportionately as the grain is built up so as to maintain a fairly constant spatial relationship between the grain and the container. Alternatively, the propellant may be ejected onto the surface of the warp of wires and be carried onto the grain. In this situation the propellant would be ejected on to the wire after the wires have passed over the rollers 32 prior to being embedded in the turning grain.

Still referring to FIG. 1, there is seen a pressure roll 38 which is maintained in contact with the surface of the grain 16 to com pact the grain and serves to produce a propellant grain having an unexpectedly high specific impulse. The compacting pressure roll 38, which may be of Teflon (tetrafluoroethylene), is rotatably mounted on arms 39 which are pivotly connected at points 42 to perpendicular support 41. A pair of pneumatic actuators 43 are affixed to the arms 39 and serve to maintain the pressure roll under constant contact pressure in relation to the entire outer surface of the grain 16. Additionally, the actuators can be regulated so as to vary the amount of pressure placed upon the grain surface and thus control the compacting of the matrix. The actuators 43 are pivotly connected to arms 44 about point 45, the arms 44 being rigidly affixed to the support 41. Obviously, means other than the pneumatic actuators may be employed to maintain the desired pressure of the pressure roll 38 upon the surface of the grain. A scraper device 46 which may be of felt or similar material is rigidly affixed to arms 39 and is maintained in contact with the roller surface 38 so as to remove excess binder material that has been squeezed out of the grain 16 and which adheres to the roller 38.

Referring now to FIG. 2, wherein the rear view of the winding device is shown, there is seen guide rods 47 situated on the surface of the base 12 upon which the solid member 48 may traverse the length of the rotating grain 16. The solid member 48 is rigidly affixed on one side to the carriage support frame 18, while at the opposite side or the rear thereof it is provided with a threaded opening therethrough which opening engages with a rotatable screw shaft 49. As the shaft 49 rotates the member 48 and carriage 18 moves longitudinally. Two microswitches 51 are situated adjacent to the base 12 of the device and spaced at a distant equivalent to the length of the grain 16. Thus, as the member 48 moves to one end of the grain 16 it is caused to strike one of the microswitches which in turn instantaneously relays an impulse to a motor 52 which drives screw shaft 49 causing the motor to reverse the rotation direction of the screw shaft so that the member 48 and thus carriage support member 18 is caused to re-traverse the length of the grain 16 until the other microswitch is actuated causing the rotatable screw to reverse direction.

Figure 4:
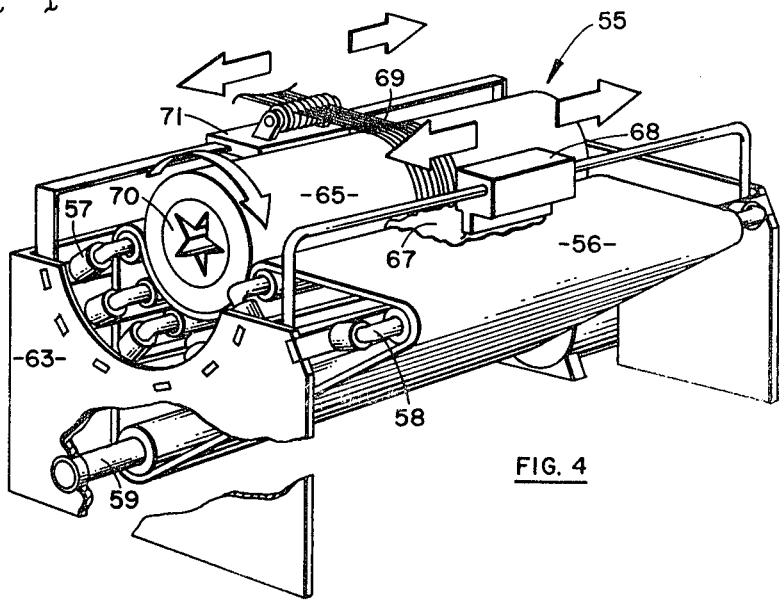
FIG. 4 is a pictorial view of a mandreless winding device.
Figure 5:
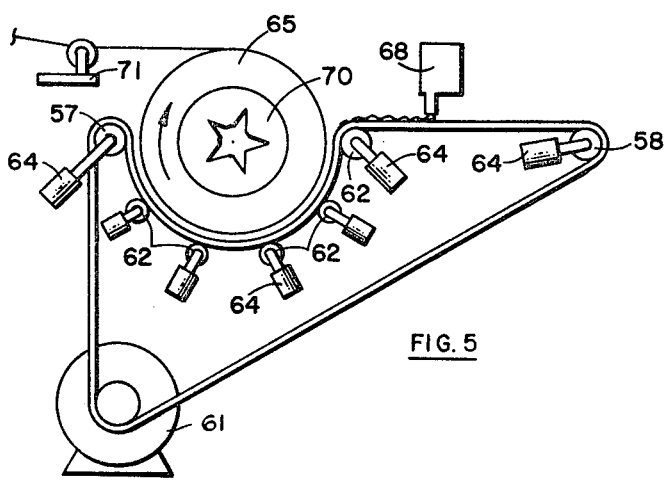
FIG. 5 is a schematic view of the device shown in FIG. 4.

Reference is now made to FIGS. 4 and 5 wherein an alternative embodiment of the present invention is seen. The apparatus shown in FIGS. 4 and 5 has particular utility wherein a conventional star grain type intercore having a reinforced grain circumferentially surrounding it is utilized in the rocket motor. As can be appreciated, there is inherent danger in placing a mandrel through the center of a star grain configuration whereby the possibility of destroying the star configuration is highly probable upon removal of the mandrel. Additionally, the unit pressure is very high on a star surface when a mandrel is extended therethrough causing possible cracks at the star surface whereas support of the large, smooth surface of the grain substantially reduces such high unit pressures. Thus, FIGS. 4 and 5 disclose a device that has no mandrel present for rotating the grain. The device 55 comprises an endless belt 56 which is caused to rotate about a plurality of rollers. As shown, the belt may move in an essentially triangular fashion about three main longitudinal rollers 57, 58 and 59 which extend the width of the endless belt 56. The belt 56 is driven by a motor 61 which connects to the main roller 59 causing the roller to rotate. A plurality of additional rollers 62 are situated in an essentially semi-circular position between the rollers 57 and 58, with all of the rollers including 58 and 59 being rigidly attached to a base structure 63. Each of the rollers 57, 58 and 62 have connected to each end thereof a pneumatic actuator 64 which can position the rollers and thus the belt in relation to the rotating grain. The rotating grain 65 having the star grain 70 therein seats within the semi-circle formed by the rollers 62 and is caused to rotate by the movement of the belt 56. In the figure shown, the belt is rotating in a counter-clockwise direction causing the grain 65 to rotate clockwise. The matrix 67 used for the grain is placed upon the belt 56 from a feed means 68 and is carried onto the grain by the belt. The plurality of reinforcing wires 69 are directed upon the rotating grain by a guide means similar to that disclosed in FIGS. 1–3. As can be readily appreciated, the applicability of the device shown in FIGS. 4 and 5 is generally dependent upon an extremely large grain having a substantial weight. Since the weight of the grain is substantial, the force of the propellant upon the plurality of rollers 62, which are likened to the idler roller shown in FIGS. 1–3, can serve to compact the grain structure of the propellant. A scraper means (not shown) may be in communication with the belt 56 to remove any excess binder material that may be forced out of the grain structure due to compaction.

The metallic wire used in the propellant grain as a fuel is a metal or metal alloy preferably containing one or more of the metals of Groups I–A, II–A, III–A, and Groups I–B through VII–B, and Group VIII of the Periodic Table. Thus, the metallic filament may contain Group I–A elements such as lithium, Group II–A metals such as beryllium or magnesium. Illustrative of the Group III–A metals is aluminum. The metals of Groups I–B through VII–B include copper, silver, zinc, cadmium, titanium, zirconium, vanadium, niobium, chromium, molybdenum, tungsten, manganese, iron, cobalt, nickel, ruthenium, rhodium, osmium, palladium, and platinum.

When preparing rocket propellants of this invention, metal filaments having good strength and high heats of combustion are preferred for inclusion in the polymeric matrix. It is also preferable to employ metals of relatively low molecular weight which give low molecular weight combustion products. Preferred metals for inclusion in the polymer matrix include aluminum, beryllium, lithium, and these metals alloyed with higher strength materials where required, because of the above considerations.

The solid oxidizer and binder material may be any of those disclosed in co-pending application Ser. No. 114,265, filed Oct. 10, 1961. A typical analysis of a reinforced propellant of this invention will consist of 11 percent of an organic binder such as Butarez (a carboxy terminated polybutadiene polymer of the Phillips Petroleum Company), 15 percent aluminum wire and 74 percent ammonium perchlorate as the combustible matrix.

In the operation of the winding device disclosed, the warp of wires 26 are wrapped in one loop around the metal mandrel 15. Then a coating of the mixture of the combustible matrix and binder is applied along the length of the mandrel as the mandrel begins to rotate. The reinforcing wire lattice may provide from less than 5 to over 80 percent of the weight of the combined lattice and matrix in which it is embedded. From 3 to 95 percent of the weight may be the polymeric binder. The precise weight ratio of filament lattice to polymeric binder will depend upon the use to which the finished composition is put and the number and amount of other ingredients included. It is generally preferred to maintain the binder at minimum weight since other ingredients tend to give a higher specific impulse. Specific impulse, $I_s$, is defined as thrust in pounds force divided by the total mass flow of exhaust products in pounds mass per second. Thus, with an increase in specific impulse, more propulsion force per pound of propellant is obtained. This leads to greater range and greater payload capability for the rocket motor. Increases of even two seconds above the art in specific impulse is significant and greatly increases the aforementioned capabilities of the rocket motor. Thus, compositions containing about 8–30 percent metal, 60–80 percent oxidizer, and from 1–30 percent binder and other additives such as curing agents if needed have been employed. This invention has the advantage of enabling the ratio of aluminum and oxidizer to be increased with respect to the binder since only enough binder need be included to cause the filament lattice to adhere and to give some fluidity to the composition. The lattice itself provides structural stability to the propellant. This structural stability formerly was a function of the strength of the polymeric binder and adhesion forces to embedded solid particles and forced the inclusion of larger than desired concentrations of binder in the propellant and therefore lower specific impulse. With a combination of a specific fuel, oxidizer, and binder, through the use of a computer it can be determined what theoretical proportions of each of the three components should be used in order to obtain the maximum specific impulse from the combination. This theoretical maximum specific impulse can never be actually obtained because of inefficiencies normally occurring in the combustion and nozzle flow systems. Before the advent of the herein invention, this maximum specific impulse could not be even closely approximated because of an extremely low binder content being required in the propellant formulation as called for by the calculations. Utilizing the concepts of this invention, particularly the ability of the idler roll to compress and interlock the oxidizer crystals, the maximum calculated specific impulses are closely approximated for the first time and it has been found that several propellant formulations containing less than the theoretical amount of binder determined from the calculations are more efficient in approaching the maximum possible specific impulse than previously formulated propellants.

With specific regard to the functioning of the compacting roll 38, it spreads the mixture 34 evenly over the entire surface of the grain and forces each layer of wire into the structure close to wires embedded in the previous longitudinal pass. Tension on the reinforcing wires causes them to sink through the excess propellant as the grain revolves. This helps to coat the wires. The compacting roll achieves two major functions: (1) air bubbles that would otherwise become flaws in the grain are worked out in the nip between the compacting roll and the surface of the grain to produce a grain having less than 0.5 percent voids which is immeasurable by X-ray technique, (2) the matrix is then made even more compact because the oxidizer crystals are apparently locked together by repeated passage of the roll over the surface. A part of the organic binder is squeezed out as the crystals are locked together and this excess binder is removed from the surface of the compacting roll by scraper plate 46 as previously described. It is this phenomeom of the locking crystals that makes it possible to produce reinforced propellants having an unusual high density and solid oxidizer loadings up to 95 percent. These high oxidizer loadings give measured specific impulse values 10 to 15 seconds higher than conventional cast propellants. As can be seen, the amount of pressure utilizing upon the compacting roll 38 can serve to regulate the relative percentages of combustible matrix and binder material.

Upon completion of the formation of the reinforced grain, the grain and mandrel (if a mandrel is used) are removed from the winding device and placed in an oven to be cured using the previously mentioned composition of aluminum wire, ammonium perchlorate oxidizer and curing agent such as MAPO which is tris[1-(2-methyl)-aziridinyl] phosphine oxide, and Butarez binder. A typical curing would take place at 165° F. for four days. Upon completion of the curing step, the mandrel (if a mandrel is used) is removed from the now-solidified propellant grain and the grain is ready for utilization after adding a motor case. Alternatively, a filament wound motor case might be applied to the grain and cured at the same time as the curing of the grain. It should be noted that the particular method of fabrication described in this invention lends itself to the application of an extremely rapid curing agent. Thus, as the matrix material is being fed into the rotating grain, an almost instantaneous curing compoud could be added simultaneously causing the binder material to cure at that time. The filament wound motor case may be applied and its resin cured with a similar rapid curing agent so a completely cured finished rocket motor is available at the end of the winding operation. This procedure would obviously decrease the production time of a propellant and could not previously have been utilized since propellants were mixed in various batch processes previous to being poured into a form for the propellant grain.

We claim:
1. A method for producing rainforced solid propellant grains comprising:
   supporting a means upon which a solid propellant grain can be formed,
   rotating the means for supporting a solid propellant grain,
   feeding a propellant matrix to the rotating means,
   supporting one or more reinforcing wires means in juxtaposition to the rotating grain,
   feeding the reinforcing wires to the means for supporting a solid propellant grain,
   moving the wires traversely to the rotating means, and
   maintaining constant pressure on the outer surface of the grain as the grain is being formed.
2. The method of claim 1 additionally comprising:
   removing excess matrix from the surface of the grain as the grain is being formed.

References Cited

UNITED STATES PATENTS

| 1,771,749 | 7/1930 | Eisenhardt | 154—53 |
| 2,826,238 | 3/1958 | Schmidt | 156—457 |
| 3,022,735 | 2/1962 | Eberle | 60—35 |
| 1,780,732 | 11/1930 | Young | 154—53 |
| 3,067,686 | 12/1962 | Coover et al. | 102—98 |

FOREIGN PATENTS

| 638,082 | 5/1950 | Great Britain. |
| 1,250,005 | 11/1960 | France. |

BENJAMIN A. BORCHELT, Primary Examiner

S. C. BENTLEY, Assistant Examiner

U.S. Cl. X.R.

156—172